US008165176B1

(12) United States Patent  
Lo et al.

(10) Patent No.: US 8,165,176 B1
(45) Date of Patent: Apr. 24, 2012

(54) SYSTEM AND METHOD FOR GENERATING A FREQUENCY RICH SPECTRUM IN A DATA STREAM

(75) Inventors: William Lo, Cupertino, CA (US); Tsungtang Wang, Santa Clara, CA (US); Xing Wu, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 326 days.

(21) Appl. No.: 12/241,253

(22) Filed: Sep. 30, 2008

Related U.S. Application Data

(60) Provisional application No. 60/978,945, filed on Oct. 10, 2007.

(51) Int. Cl.
 *H04J 3/02* (2006.01)
(52) U.S. Cl. .......................................... 370/535; 370/503
(58) Field of Classification Search ............... 370/230.1, 370/231, 503, 515, 535; 341/51, 55
 See application file for complete search history.

(56) References Cited

U.S. PATENT DOCUMENTS

| 6,501,396 B1 * | 12/2002 | Kryzak et al. | 341/59 |
| 7,089,485 B2 * | 8/2006 | Azadet et al. | 714/798 |
| 7,668,194 B2 * | 2/2010 | Chang et al. | 370/465 |
| 2003/0214975 A1 * | 11/2003 | Woelk et al. | 370/503 |
| 2005/0213596 A1 * | 9/2005 | Mizutani | 370/431 |
| 2007/0262891 A1 * | 11/2007 | Woodral et al. | 341/51 |
| 2009/0189794 A1 * | 7/2009 | Baumer | 341/95 |

OTHER PUBLICATIONS

IEEE standard for information technology 802.3ae Media Access Control (MAC) Parameters, Physical Layer, and Management Parameters for 10 Gb/s Operation),Aug. 30, 2002.*
IEEE Std 802.3™-2005 (Revision of IEEE Std 802.3-2002 including all approved amendments); IEEE Standard for Information technology—Telecommunications and information exchange between systems—Local and metropolitan area networks—Speific requirements—Part 3: Carrier sense multiple access with collision detection (CSMA/CD) access method and physical layer specifications; IEEE Computer Society; Sponsored by the LAN/MAN Standards Committee; Dec. 9, 2005; Section 1, 628 pages; Section 2, 810 pages; Section 3, 387 pages; Section 4, 454 pages; Section 5, 417 pages.

* cited by examiner

*Primary Examiner* — Aung S Moe
*Assistant Examiner* — Awet Haile

(57) ABSTRACT

A system and method for generating a frequency rich spectrum in a data stream is disclosed. A network interface comprises a substitutor module, a symbol replacement module, and an encoder module. The substitutor module replaces idle streams in a first data stream with alignment symbols, boundary symbols and disposable symbols to generate a second data stream. The symbol replacement module receives the second data stream, generates random data, and replaces one or more of the disposable symbols in the second data stream with the random data in order to generate a third data stream. The encoder module encodes the third data stream.

26 Claims, 13 Drawing Sheets

|  | Dx.0 | Dx.1 | Dx.2 | Dx.3 | Dx.4 | Dx.5 | Dx.6 | Dx.7 |
|---|---|---|---|---|---|---|---|---|
| D0 | Preserving |  |  |  | Preserving |  |  | Preserving |
| D1 | Preserving |  |  |  | Preserving |  |  | Preserving |
| D2 | Preserving |  |  |  | Preserving |  |  | Preserving |
| D3 |  | Preserving | Preserving | Preserving |  | Preserving |  | Preserving |
| D4 | Preserving |  |  |  | Preserving |  | Preserving |  |
| D5 |  | Preserving | Preserving | Preserving |  | Preserving | Preserving |  |
| D6 |  | Preserving | Preserving | Preserving |  | Preserving | Preserving |  |
| D7 |  | Preserving | Preserving | Preserving |  | Preserving | Preserving |  |
| D8 | Preserving |  |  |  | Preserving |  |  | Preserving |
| D9 |  | Preserving | Preserving | Preserving |  | Preserving | Preserving |  |
| D10 |  | Preserving | Preserving | Preserving |  | Preserving | Preserving |  |
| D11 |  | Preserving |  | Preserving |  | Preserving | Preserving |  |
| D12 |  | Preserving | Preserving | Preserving |  | Preserving | Preserving |  |
| D13 |  | Preserving | Preserving | Preserving |  | Preserving | Preserving |  |
| D14 |  | Preserving | Preserving | Preserving |  | Preserving | Preserving |  |
| D15 | Preserving |  |  |  | Preserving |  |  | Preserving |
| D16 | Preserving |  |  |  | Preserving |  |  | Preserving |
| D17 |  | Preserving | Preserving | Preserving |  | Preserving | Preserving |  |
| D18 |  | Preserving | Preserving | Preserving |  | Preserving | Preserving |  |
| D19 |  | Preserving | Preserving | Preserving |  | Preserving | Preserving |  |
| D20 |  | Preserving | Preserving | Preserving |  | Preserving | Preserving |  |
| D21 |  | Preserving | Preserving | Preserving |  | Preserving | Preserving |  |
| D22 |  | Preserving |  | Preserving |  |  |  |  |
| D23 | Preserving |  |  |  | Preserving |  |  | Preserving |
| D24 | Preserving |  |  |  | Preserving |  |  | Preserving |
| D25 |  | Preserving | Preserving | Preserving |  | Preserving | Preserving |  |
| D26 |  | Preserving |  | Preserving |  | Preserving | Preserving |  |
| D27 | Preserving |  |  |  | Preserving |  |  | Preserving |
| D28 |  | Preserving | Preserving | Preserving |  | Preserving | Preserving |  |
| D29 | Preserving |  |  |  | Preserving |  |  | Preserving |
| D30 | Preserving |  |  |  | Preserving |  |  | Preserving |
| D31 | Preserving |  |  |  | Preserving |  |  | Preserving |

SYSTEM AND METHOD FOR GENERATING A FREQUENCY RICH SPECTRUM IN A DATA STREAM

CROSS-REFERENCE TO RELATED APPLICATIONS

This application claims the benefit of U.S. Provisional Application No. 60/978,945 filed on Oct. 10, 2007. The disclosure of the above application is incorporated herein by reference in its entirety.

FIELD

The disclosure relates to networks, and more particularly to data coding in physical coding sublayers of physical layer devices in Ethernet network devices.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Network interfaces include physical layer devices that transmit and receive data over a medium. In a 10 gigabit/second (10 Gb) network, the physical layer devices can include a physical coding sublayer (PCS) module that encodes, multiplexes, and synchronizes outgoing symbol streams. The PCS module also aligns, demultiplexes, and decodes incoming symbol streams. In one approach, the PCS module is implemented based on a 10 GBASE-X standard in the Institute of Electrical and Electronics Engineers (IEEE) 802.3 specification, which is hereby incorporated by reference in its entirety. The 10 GBASE-X standard provides for 4-lane to 4-lane aggregation through the PCS module and specifies an 8-bit to 10-bit (8/10) encoding pattern for each lane. FIGS. 1-3 provide examples of PCS modules according to the 10 GBASE-X standard.

Referring now to FIG. 1, the International Organization for Standardization's ISO Open Systems Interconnection (OSI) model 10 includes a physical layer device 12 for transmitting and receiving data over a medium. The physical layer device 12 can employ different architectures for various types of physical media and bandwidth requirements.

Two example 10 Gb architectures are provided at 14-1 and 14-2. First 10 Gb architecture 14-1 is suitable for a single chip or system-on-chip (SOC) implementation of physical layer device 12. A reconciliation layer 16 provides a logical connection between a medium access control (MAC) device and other elements of the physical layer device 12. Reconciliation layer 16 communicates with a PCS module 20 via a 10 Gb media-independent interface (XGMII) 18. PCS module 20 communicates with a physical medium attachment unit (PMA) 22 that includes clock recovery and compensation logic for the incoming symbol streams. PCS module 20 communicates with a physical medium dependant (PMD) sublayer 24 that includes transmitters and receivers (transceivers). A media-dependent interface (MDI) 26-1, 26-2 connects PMD 24 to a communication medium 28. MDI 26 can include various fiber-optic and copper connections to medium 28.

The second 10 Gb architecture 14-2 is suitable for use in applications that include chip-to-chip and/or backplane structures. In such applications, the physical layer device 12 is remotely located from the MAC device and/or other higher network layers. An XGMII extender 29 allows XGMII 18 to communicate over greater distances. Extender 29 includes a pair of 10 Gb extended sublayer (XGXS) interface devices that connect to respective XGMII 18 interfaces of reconciliation layer 16 and PCS module 20. An extended attachment unit interface (XAUI) connects between the XGXS interface devices and provides 10 Gb communication through four lanes of communication.

Referring now to FIG. 2, a physical layer connection is shown between two network stations that employ the 10 GBASE-X standard. The stations include respective PCS module 20-1 and 20-2, referred to collectively as PCS modules 20. Each PCS module 20 communicates through medium 28, which includes four lanes.

First PCS module 20-1 receives data and idle symbols via four-lane XGMII 18. A substitutor module 30 replaces the idle symbols with specified control symbols and then outputs the data and control symbols onto four lanes 32-0, . . . , 32-3, referred to collectively as lanes 32. The control symbols include alignment symbols /A/, boundary symbols /K/, and disposable symbols /R/. The boundary symbols /K/ represent boundaries of respective data groups. Substitutor module 30 periodically generates the alignment symbols /A/Customer simultaneously on all lanes 32 with a pseudo-random period. The pseudo-random period satisfies minimum and maximum spacing specifications. Second PCS module 20-2 then uses each group of alignment symbols /A/ to compensate for timing differences between the lanes 32. Substitutor module 30 also adds and deletes the disposable symbols /R/ from each lane 32 to compensate for frequency differences between XGMII 18 and lanes 32.

Each output of substitutor module 30 is eight bits wide. Each lane 32 includes an 8-to-10 bit converter 34 that converts the 8-bit data to the 10-bit format. Bit patterns in the 10-bit format are generated according to an algorithm that maximizes signal level switching across the medium 28. The signal level switching minimizes the risk of developing a DC offset in the medium 28. An output of each 8/10 bit converter 34 communicates with an input of a respective amplifier 36. Each amplifier 36 drives the 10-bit data onto a respective lane of medium 28. Amplifiers 38 communicate the 10-bit data to respective 8/10 bit converters 40 that restore the 8-bit data. The restored 8-bit data leaves respective 8/10 bit converters at different times, i.e., the restored 8-bit data is misaligned due to different propagation delays through each of lanes 32. Lane alignment module 42 realigns the data based on the alignment symbols /A/ that were inserted by substitutor module 30, as shown in FIG. 3. Lane alignment module 42 communicates the realigned data to an XGMII 18 of second PCS module 20-2.

Referring now to FIG. 3, first and second data diagrams 50-1, 50-2 show the four lanes of data into and out of substitutor module 30. In first data diagram 50-1 idle symbols are represented by blank fields 52. Data is represented by data fields 54 that include data $D_N$, where N represents a serial order of the respective data field. An /S/ symbol in field 56 represents a start of the data. A /T/ symbol in field 58 represents a terminus of the data. A column of the simultaneously-inserted alignment symbols /A/ appear at fields 60 and are used by lane alignment module 42.

The frequency spectrum of 10 GBASE-X idle streams, because of the repeated use of symbols /A/, /K/ and /R/, is very different from the spectrum of random data streams. Instead of a uniform frequency distribution, as with a stream of random data, a 10 GBASE-X data stream results in numerous peaks and valleys in frequency distribution, which may interfere with the operation of the system.

SUMMARY

The disclosure addresses the above identified issue by providing a system and method for providing a more uniform frequency distribution in a 10 GBASE-X data stream.

In some embodiments of the present disclosure, a network interface is disclosed. The network interface comprises a substitutor module that replaces idle symbols in a first data stream with one or more of alignment symbols, boundary symbols and disposable symbols to generate a second data stream, a symbol replacement module that receives the second data stream, that generates random data, and that replaces at least one of the disposable symbols in the second data stream with the random data to generate a third data stream, and an encoder module that receives and encodes the third data stream.

In some embodiments, the symbol replacement module detects the disposable symbols in the second data stream.

In some embodiments, the network interface further comprises a random number generator that generates the random data.

In some embodiments, the symbol replacement module receives the second data stream over a plurality of lanes and alternates selection of one of the plurality of lanes that receives the random data.

In some embodiments, the symbol replacement module generates the random data by generating a random binary number and by selecting a data value associated with the random binary number as the random data.

In some embodiments, the symbol replacement module generates the random data by generating a random binary number and by selecting at least a portion of the random binary number as the random data.

In some embodiments, the disposable symbols comprise disposable symbols /R/, the second data stream comprises a 10 GBASE-X data stream, the symbol replacement module comprises an /R/ to /D/ symbol replacement module, and the encoder module comprises an 8/10 bit encoder module.

In some embodiments, the /R/ to /D/ symbol replacement module detects disposable symbols /R/ in the 10 GBASE-X data stream.

In some embodiments, the symbol replacement module replaces a subset of the disposable symbols /R/ that comprises two of four lanes in an aligned column of the 10 GBASE-X data stream with the random data.

In some embodiments, the /R/ to /D/ symbol replacement module alternates selection of two of the four lanes of disposable symbols /R/ that comprise the subset of the disposable symbols /R/.

In some embodiments, the network interface comprises a decoder module that receives and decodes a first data stream comprising one or more of random data, alignment symbols, boundary symbols and first disposable symbols, and a symbol replacement module that receives the first data stream, detects the first disposable symbols in the first data stream, determines the random data of the first data stream based on the detected first disposable symbols, and replaces the random data in the first data stream with second disposable symbols to generate a second data stream.

In some embodiments, the symbol replacement module detects the first disposable symbols in at least one of four lanes in an aligned column of the first data stream.

In some embodiments, the symbol replacement module detects the first disposable symbols in two of four lanes in an aligned column of the first data stream.

In some embodiments, the first data stream comprises an original data stream with at least one disposable symbol replaced by the random data.

In some embodiments, the original data stream and the second data stream comprise identical data.

In some embodiments, the symbol replacement module detects the first disposable symbols in two of four lanes in an aligned column of the first data stream.

In some embodiments, the random data is generated by generating a random binary number and by selecting a data value associated with the random binary number as the random data.

In some embodiments, the random data is generated by generating a random binary number and by selecting at least a portion of the random binary number as the random data.

In some embodiments, the decoder module comprises an 8/10 bit decoder module, the symbol replacement module comprises a /D/ to /R/ symbol replacement module, the first data stream comprises a 10 GBASE-X data stream, and the disposable symbols comprise disposable symbols /R/.

In some embodiments, the detection of disposable symbols in the first data stream comprises detecting a disposable symbol /R/ in at least one of four lanes in an aligned column of the 10 GBASE-X data stream.

In some embodiments, the detection of disposable symbols in the first data stream comprises detecting a disposable symbol /R/ in two of four lanes in an aligned column of the 10 GBASE-X data stream.

In some embodiments, the random data has replaced at least one disposable symbol /R/ in an original data stream to generate the 10 GBASE-X data stream.

In some embodiments, the original data stream and the second data stream comprise identical data.

In some embodiments of the present disclosure, a method for generating a data stream is disclosed. The method comprises replacing idle symbols in a first data stream with one or more of alignment symbols, boundary symbols and disposable symbols to generate a second data stream, generating random data, replacing at least one of the disposable symbols in the second data stream with the random data to generate a third data stream, and encoding the third data stream.

In some embodiments, the method further comprises detecting the disposable symbols in the second data stream.

In some embodiments, the random data is generated by a random number generator.

In some embodiments, the second data stream comprises a plurality of lanes and the replacing at least one of the disposable symbols in the second data stream with the random data to generate the third data stream comprises alternating selection of one of the plurality of lanes that receives the random data.

In some embodiments, the random data is generated by generating a random binary number and by selecting a data value associated with the random binary number as the random data.

In some embodiments, the random data is generated by generating a random binary number and by selecting at least a portion of the random binary number as the random data.

In some embodiments, the disposable symbols comprise disposable symbols /R/, the second data stream comprises a 10 GBASE-X data stream, the generating random data and the replacing at least one of the disposable symbols in the second data stream with the random data to generate the third data stream is performed by an /R/ to /D/ symbol replacement module, and the encoding the third data stream is performed by an 8/10 bit encoder module.

In some embodiments, the /R/ to /D/ symbol replacement module detects disposable symbols /R/ in the 10 GBASE-X data stream.

In some embodiments, the /R/ to /D/ symbol replacement module replaces a subset of the disposable symbols /R/ that comprises two of four lanes in an aligned column of the 10 GBASE-X data stream with the random data.

In some embodiments, the /R/ to /D/ symbol replacement module alternates selection of two of the four lanes of disposable symbols /R/ that comprise the subset of the disposable symbols /R/.

In some embodiments of the present disclosure, a method for processing a data stream is disclosed. The method comprises decoding a first data stream comprising one or more of random data, alignment symbols, boundary symbols and first disposable symbols, detecting the first disposable symbols in the first data stream, determining the random data of the first data stream based on the detected first disposable symbols, and replacing the random data in the first data stream with second disposable symbols to generate a second data stream.

In some embodiments, the detecting the first disposable symbols in the first data stream comprises detecting the first disposable symbols in at least one of four lanes in an aligned column of the first data stream.

In some embodiments, the detecting the first disposable symbols in the first data stream comprises detecting the first disposable symbols in two of four lanes in an aligned column of the first data stream.

In some embodiments, the first data stream comprises an original data stream with at least one disposable symbol replaced by the random data.

In some embodiments, the original data stream and the second data stream comprise identical data.

In some embodiments, the detecting the first disposable symbols in the first data stream comprises detecting the first disposable symbols in two of four lanes in an aligned column of the first data stream.

In some embodiments, the random data is generated by generating a random binary number and by selecting a data value associated with the random binary number as the random data.

In some embodiments, the random data is generated by generating a random binary number and by selecting at least a portion of the random binary number as the random data.

In some embodiments, the decoding the first data stream comprising one or more of random data, alignment symbols, boundary symbols and first disposable symbols is performed by an 8/10 bit decoder module, the detecting the first disposable symbols in the first data stream, the determining the random data of the first data stream based on the detected first disposable symbols, and the replacing the random data in the first data stream with second disposable symbols to generate the second data stream is performed by a /D/ to /R/ symbol replacement module, the first data stream comprises a 10 GBASE-X data stream, and the disposable symbols comprise disposable symbols /R/.

In some embodiments, the detecting the first disposable symbols in the first data stream comprises detecting a disposable symbol /R/ in at least one of four lanes in an aligned column of the 10 GBASE-X data stream.

In some embodiments, the detecting the first disposable symbols in the first data stream comprises detecting a disposable symbol /R/ in two of four lanes in an aligned column of the 10 GBASE-X data stream.

In some embodiments, the random data has replaced at least one disposable symbol /R/ in an original data stream to generate the 10 GBASE-X data stream.

In some embodiments, the original data stream and the second data stream comprise identical data.

In some embodiments of the present disclosure, a computer program stored on a computer readable medium and executed by a processor for generating a data stream is disclosed. The computer program comprises replacing idle symbols in a first data stream with one or more of alignment symbols, boundary symbols and disposable symbols to generate a second data stream, generating random data, replacing at least one of the disposable symbols in the second data stream with the random data to generate a third data stream, and encoding the third data stream.

In some embodiments, the computer program further comprises detecting the disposable symbols in the second data stream.

In some embodiments, the random data is generated by a random number generator.

In some embodiments, the second data stream comprises a plurality of lanes and the replacing at least one of the disposable symbols in the second data stream with the random data to generate the third data stream comprises alternating selection of one of the plurality of lanes that receives the random data.

In some embodiments, the random data is generated by generating a random binary number and by selecting a data value associated with the random binary number as the random data.

In some embodiments, the random data is generated by generating a random binary number and by selecting at least a portion of the random binary number as the random data.

In some embodiments, the disposable symbols comprise disposable symbols /R/, the second data stream comprises a 10 GBASE-X data stream, the generating random data and the replacing at least one of the disposable symbols in the second data stream with the random data to generate the third data stream is performed by an /R/ to /D/ symbol replacement module, and the encoding the third data stream is performed by an 8/10 bit encoder module.

In some embodiments, the /R/ to /D/ symbol replacement module detects disposable symbols /R/ in the 10 GBASE-X data stream.

In some embodiments, the /R/ to /D/ symbol replacement module replaces a subset of the disposable symbols /R/ that comprises two of four lanes in an aligned column of the 10 GBASE-X data stream with the random data.

In some embodiments, the /R/ to /D/ symbol replacement module alternates selection of two of the four lanes of disposable symbols /R/ that comprise the subset of the disposable symbols /R/.

In some embodiments of the present disclosure, a computer program stored on a computer readable medium and executed by a processor for processing a data stream is disclosed. The computer program comprises decoding a first data stream comprising one or more of random data, alignment symbols, boundary symbols and first disposable symbols, detecting the first disposable symbols in the first data stream, determining the random data of the first data stream based on the detected first disposable symbols, and replacing the random data in the first data stream with second disposable symbols to generate a second data stream.

In some embodiments, the detecting the first disposable symbols in the first data stream comprises detecting the first disposable symbols in at least one of four lanes in an aligned column of the first data stream.

In some embodiments, the detecting the first disposable symbols in the first data stream comprises detecting the first disposable symbols in two of four lanes in an aligned column of the first data stream.

In some embodiments, the first data stream comprises an original data stream with at least one disposable symbol replaced by the random data.

In some embodiments, the original data stream and the second data stream comprise identical data.

In some embodiments, the detecting the first disposable symbols in the first data stream comprises detecting the first disposable symbols in two of four lanes in an aligned column of the first data stream.

In some embodiments, the random data is generated by generating a random binary number and by selecting a data value associated with the random binary number as the random data.

In some embodiments, the random data is generated by generating a random binary number and by selecting at least a portion of the random binary number as the random data.

In some embodiments, the decoding the first data stream comprising one or more of random data, alignment symbols, boundary symbols and first disposable symbols is performed by an 8/10 bit decoder module, the detecting the first disposable symbols in the first data stream, the determining the random data of the first data stream based on the detected first disposable symbols, and the replacing the random data in the first data stream with second disposable symbols to generate the second data stream is performed by a /D/ to /R/ symbol replacement module, the first data stream comprises a 10 GBASE-X data stream, and the disposable symbols comprise disposable symbols /R/.

In some embodiments, the detecting the first disposable symbols in the first data stream comprises detecting a disposable symbol /R/ in at least one of four lanes in an aligned column of the 10 GBASE-X data stream.

In some embodiments, the detecting the first disposable symbols in the first data stream comprises detecting a disposable symbol /R/ in two of four lanes in an aligned column of the 10 GBASE-X data stream.

In some embodiments, the random data has replaced at least one disposable symbol /R/ in an original data stream to generate the 10 GBASE-X data stream.

In some embodiments, the original data stream and the second data stream comprise identical data.

In some embodiments of the present disclosure, a network interface is disclosed. The network interface comprises a substitutor means for replacing idle symbols in a first data stream with one or more of alignment symbols, boundary symbols and disposable symbols to generate a second data stream, a symbol replacement means for receiving the second data stream, that generates random data, and for replacing at least one of the disposable symbols in the second data stream with the random data to generate a third data stream, and an encoder means for receiving and encoding the third data stream.

In some embodiments, the symbol replacement means detects the disposable symbols in the second data stream.

In some embodiments, the network interface further comprises a random number generator means for generating the random data.

In some embodiments, the symbol replacement means receives the second data stream over a plurality of lanes and alternates selection of one of the plurality of lanes that receives the random data.

In some embodiments, the symbol replacement means generates the random data by generating a random binary number and by selecting a data value associated with the random binary number as the random data.

In some embodiments, the symbol replacement means generates the random data by generating a random binary number and by selecting at least a portion of the random binary number as the random data.

In some embodiments, the disposable symbols comprise disposable symbols /R/, the second data stream comprises a 10 GBASE-X data stream, the symbol replacement means comprises an /R/ to /D/ symbol replacement module, and the encoder means comprises an 8/10 bit encoder module.

In some embodiments, the /R/ to /D/ symbol replacement means detects disposable symbols /R/ in the 10 GBASE-X data stream.

In some embodiments, the symbol replacement means replaces a subset of the disposable symbols /R/ that comprises two of four lanes in an aligned column of the 10 GBASE-X data stream with the random data.

In some embodiments, the /R/ to /D/ symbol replacement means alternates selection of two of the four lanes of disposable symbols /R/ that comprise the subset of the disposable symbols /R/.

In some embodiments of the present disclosure, a network interface is disclosed. The network interface comprises a decoder means for receiving and decoding a first data stream comprising one or more of random data, alignment symbols, boundary symbols and first disposable symbols, and a symbol replacement means for receiving the first data stream, for detecting the first disposable symbols in the first data stream, for determining the random data of the first data stream based on the detected first disposable symbols, and for replacing the random data in the first data stream with second disposable symbols to generate a second data stream.

In some embodiments, the symbol replacement means detects the first disposable symbols in at least one of four lanes in an aligned column of the first data stream.

In some embodiments, the symbol replacement means detects the first disposable symbols in two of four lanes in an aligned column of the first data stream.

In some embodiments, the first data stream comprises an original data stream with at least one disposable symbol replaced by the random data.

In some embodiments, the original data stream and the second data stream comprise identical data.

In some embodiments, the symbol replacement means detects the first disposable symbols in two of four lanes in an aligned column of the first data stream.

In some embodiments, the random data is generated by generating a random binary number and by selecting a data value associated with the random binary number as the random data.

In some embodiments, the random data is generated by generating a random binary number and by selecting at least a portion of the random binary number as the random data.

In some embodiments, the decoder means comprises an 8/10 bit decoder module, the symbol replacement means comprises a /D/ to /R/symbol replacement module, the first data stream comprises a 10 GBASE-X data stream, and the disposable symbols comprise disposable symbols /R/.

In some embodiments, the detection of disposable symbols in the first data stream comprises detecting a disposable symbol /R/ in at least one of four lanes in an aligned column of the 10 GBASE-X data stream.

In some embodiments, wherein the detection of disposable symbols in the first data stream comprises detecting a disposable symbol /R/ in two of four lanes in an aligned column of the 10 GBASE-X data stream.

In some embodiments, the random data has replaced at least one disposable symbol /R/ in an original data stream to generate the 10 GBASE-X data stream.

In some embodiments, the original data stream and the second data stream comprise identical data.

In still other features, the systems and methods described above are implemented by a computer program executed by one or more processors. The computer program can reside on a computer readable medium such as but not limited to memory, nonvolatile data storage, and/or other suitable tangible storage mediums.

Further areas of applicability of the present disclosure will become apparent from the detailed description, the claims and the drawings. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 7 is a table that lists the 8-bit symbols that preserve disparity on a signal line;

FIG. 9A is a data diagram of data and idle symbols in the exemplary 10 GBASE-X idle stream of FIG. 8A in a non-interleaved mode in which a subset of /R/ symbols has been replaced with random data;

FIG. 9B is a data diagram of data and idle symbols in the exemplary 10 GBASE-X idle stream of FIG. 8A in an interleaved mode in which a subset of disposable symbols /R/ has been replaced with random data;

DETAILED DESCRIPTION

Figure 1:
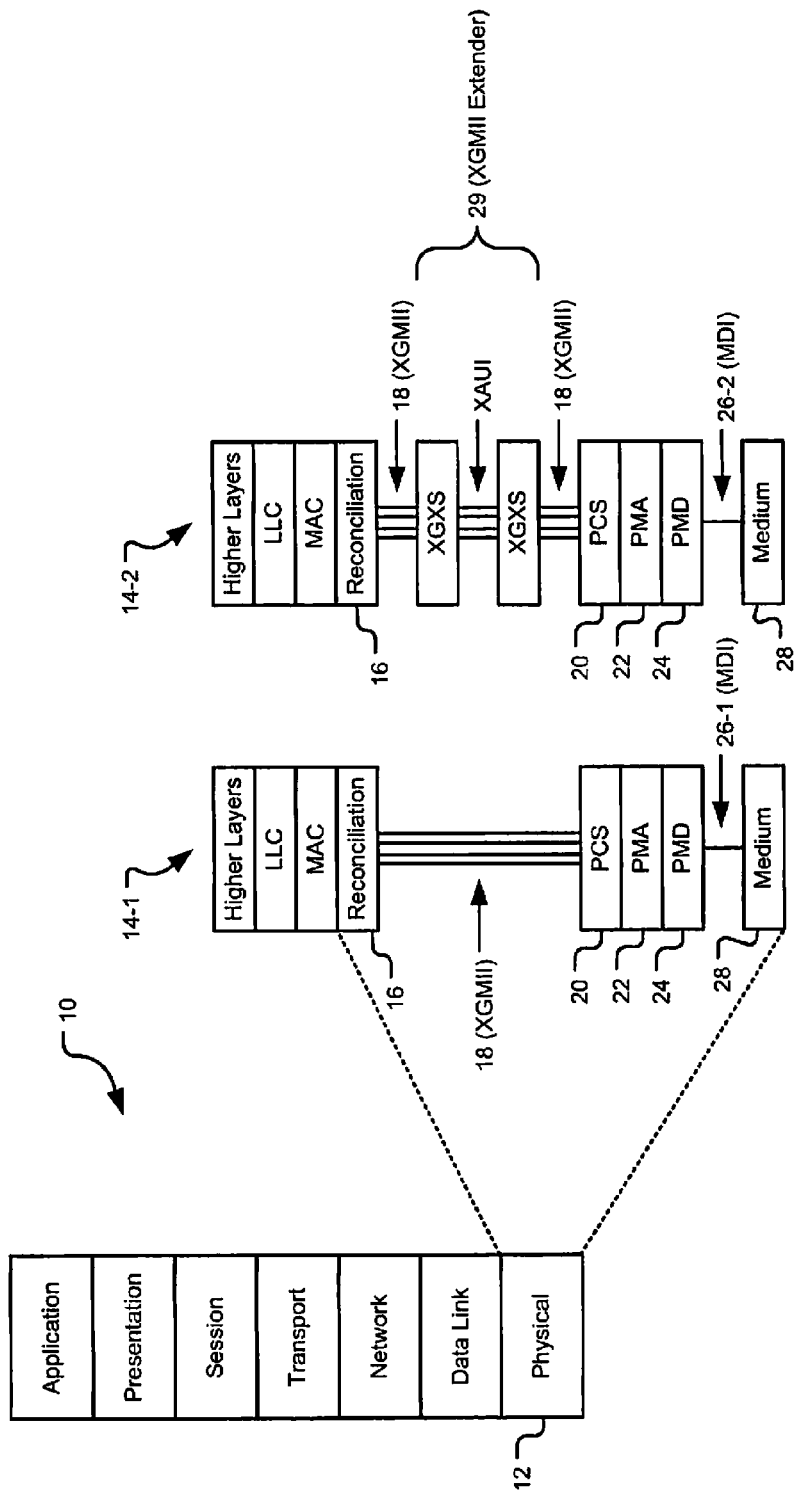
FIG. 1 is a functional block diagram of the OSI Model and sublayers in a physical layer device according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

As stated above, the frequency spectrum of idle data streams may differ from that of a random packet of data to an extent that affects the performance of a communication system. For example, the frequency spectrum of an idle stream in a 10 GBASE-X system contains peaks and valleys at certain frequencies and does not exhibit the "flat" frequency distribution associated with random data. These peaks and valleys may affect the operation of a de-serializer using a decision feedback equalizer (DFE) to compensate for inter-symbol interference that is introduced when signals propagate across long backplane traces. The present disclosure is directed to a system and method for generating a frequency rich spectrum in a communication data stream. The system and method of the present disclosure effectively "randomizes" the communication data stream without affecting the relevant data content therein.

Figure 2:
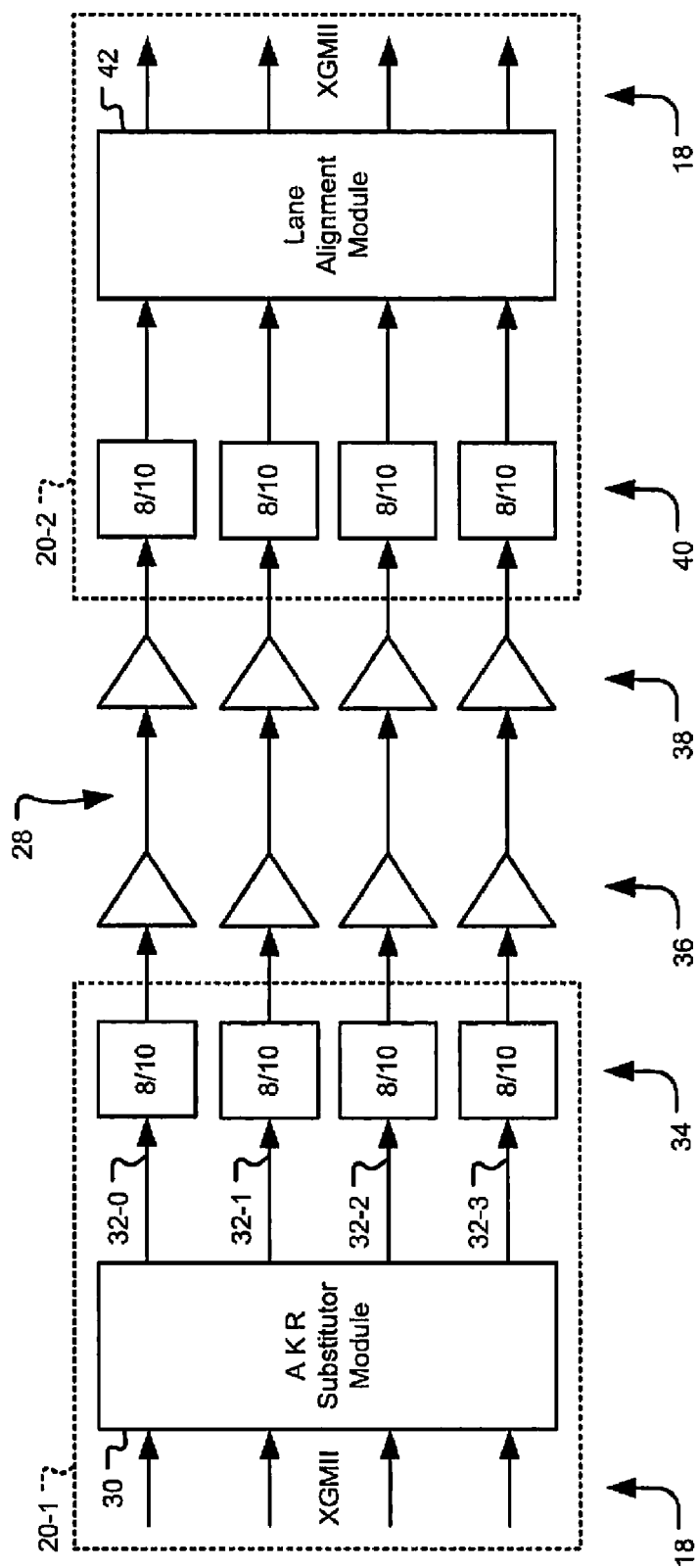
FIG. 2 is a functional block diagram of 10 GBASE-X transmit and receive PCS module layers according to the prior art.
Figure 3:
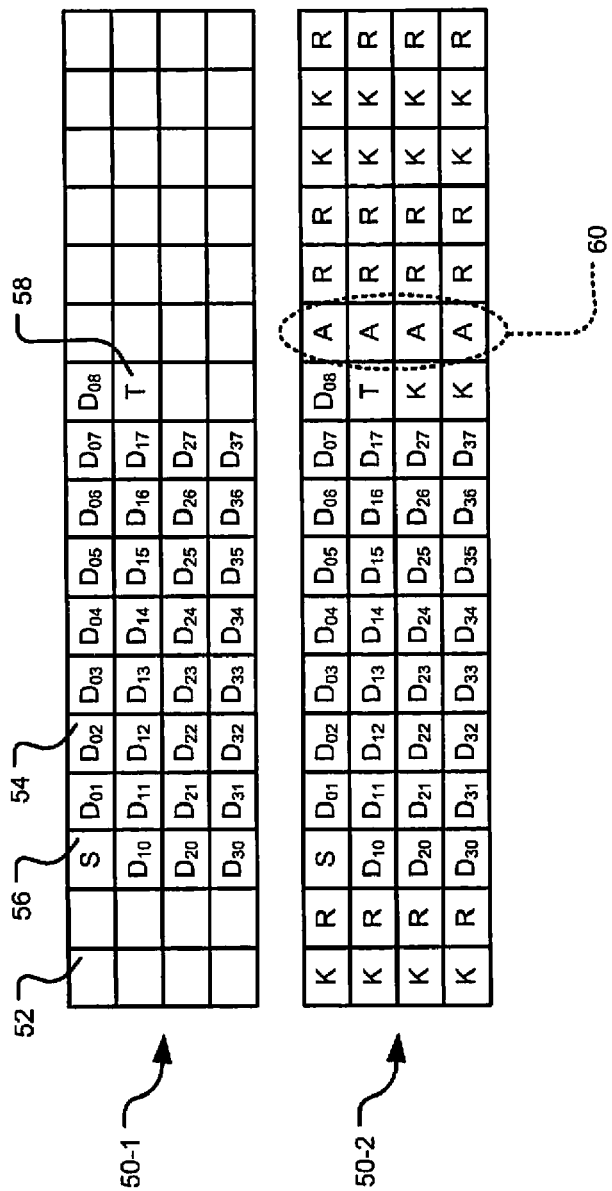
FIG. 3 is a data diagram of data and idle symbols in the transmit PCS module of FIG. 2.
Figure 4:
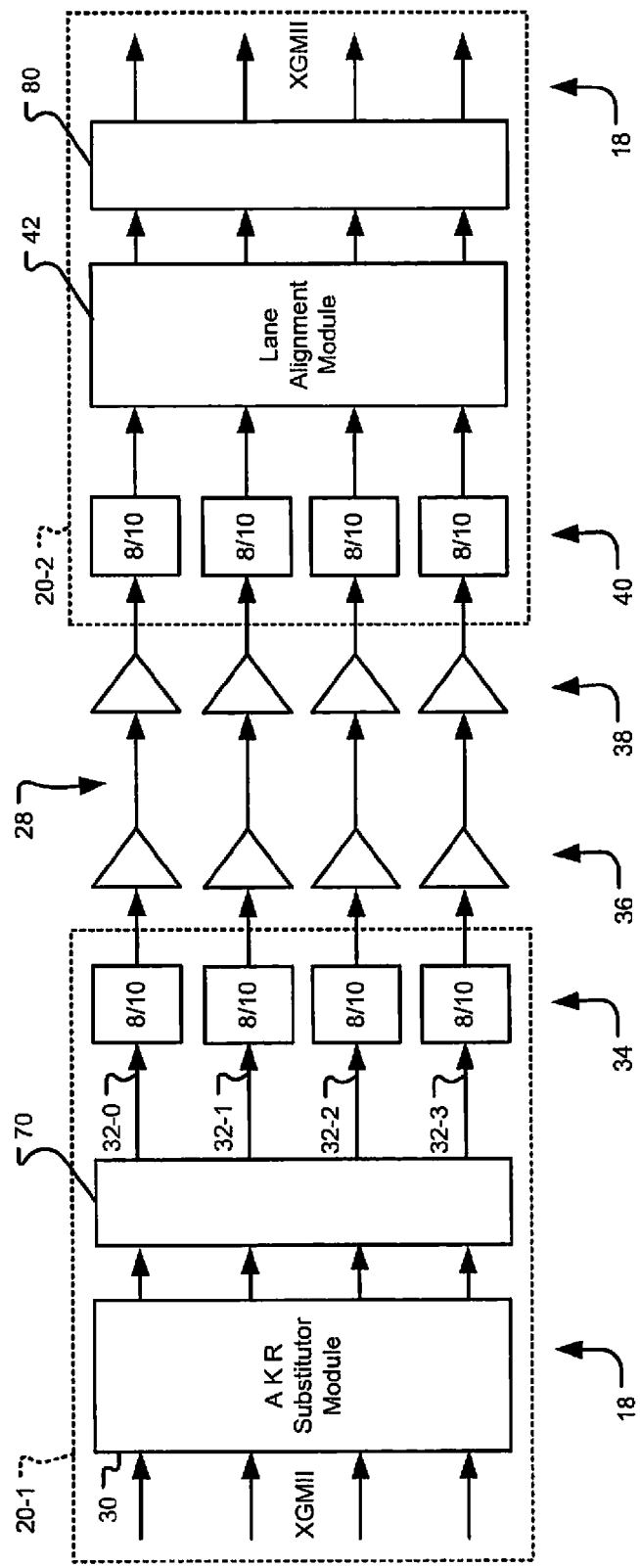
FIG. 4 is a functional block diagram of 10 GBASE-X transmit and receive PCS module layers for implementing a method of replacing a subset of disposable symbols /R/ in a 10 GBASE-X idle stream with random data.

Referring now to FIG. 4, a physical layer connection according to various embodiments of the disclosure is shown between two network stations that employ the 10 GBASE-X standard. The stations include respective PCS module 20-1 and 20-2, referred to collectively as PCS modules 20. PCS modules 20 communicate through medium 28, which includes four lanes. In contrast to the physical layer connection shown in FIG. 2, PCS modules 20-1 and 20-2 include /R/ to /D/ symbol replacement module 70 and /D/ to /R/ symbol replacement module 80, respectively. The symbol replacement modules 70, 80 provide for the transmission and reception of a data stream having a frequency rich spectrum over medium 28.

Figure 5:
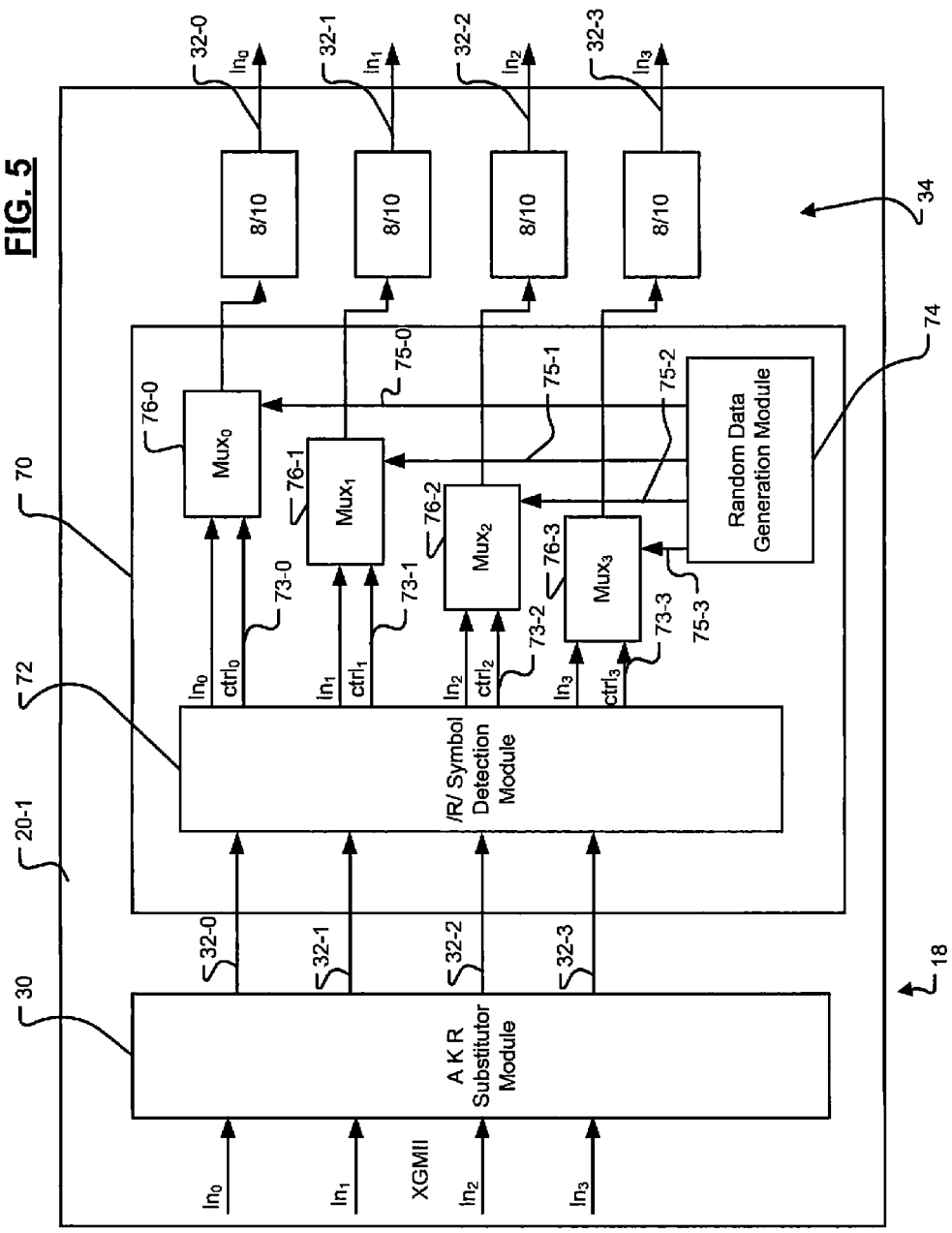
FIG. 5 is a functional block diagram of a 10 GBASE-X transmit PCS module layer for implementing a method of replacing a subset of disposable symbols /R/ in a 10 GBASE-X idle stream with random data in a non-interleaved mode.

Referring now to FIG. 5, the elements of /R/ to /D/ symbol replacement module 70 in some embodiments of the disclosure are illustrated in greater detail. The signals transmitted from A K R substitutor module 30 travel on lanes 32 to /R/ to /D/ symbol replacement module 70. Upon entering /R/ to /D/ symbol replacement module 70, the data signals in lanes 32 are first received at /R/ symbol detection module 72. /R/ symbol detection module 72 is configured to detect disposable symbols /R/ in the data stream traveling over the lanes 32. The signals are then passed to multiplexing module 76, which may comprise one module or separate modules, e.g., multiplexing modules 76-0, 76-1, 76-2, 76-3 as illustrated. Furthermore, /R/ symbol detection module 72 generates multiplexing control signals 73-0 through 73-3, which are passed to the multiplexing module 76.

Random data generation module 74 outputs a plurality of random data on signal line 75 (e.g., signal lines 75-0 to 75-3 in FIG. 5). Signal line 75 is input to the multiplexing module 76. Based on the control signal 73, as described more fully below, for each of lanes 32, multiplexing module 76 outputs either the data signal received from the /R/ symbol detection module 72 or the random data received from the random data generation module 74. The output of the multiplexing module 76 is passed to 8-to-10 bit converter circuits 34, which then output the converted 10-bit signal onto lanes 32.

The operation of /R/ to /D/ symbol replacement module 70 is based on the fact that the disposable symbols /R/ transmitted across each of the lanes are disposable and contain no necessary or useful information. The disposable symbols /R/ are output by A K R substitutor module 30, for example, to compensate for frequency differentials between XGMII 18 and lanes 32, as described in the 10 GBASE-X standard in the IEEE 802.3 specification. As described above, the data stream generated by the A K R substitutor module 30 contains a frequency spectrum that is very different from the frequency spectrum of a packet of random data. Thus, the disclosure replaces a subset (or all) of the disposable symbols /R/ output from the A K R substitutor module 30 with random data so as to generate a signal with a frequency spectrum more similar to that of a packet of random data. This is accomplished by the /R/ symbol detection module 72 (of the /R/ to /D/ symbol replacement module 70) detecting a column of disposable symbols /R/ in lanes 32.

Upon the detection of a column of disposable symbols /R/, /R/symbol detection module 72 outputs multiplexing control signal 73 to multiplexing module 76. The control signal 73 is designed to control the multiplexing module 76 such that, upon detection of a column of disposable symbols /R/, multiplexing module 76 replaces a disposable symbol /R/ in a subset of the lanes 32-0 to 32-3 with randomly generated data from random data generation module 74. The result is that the signal output from /R/ to /D/ symbol replacement module 70, which is passed to 8-to-10 bit converter circuit 34, contains a mixture of disposable symbols /R/ and randomly generated data in each column that previously included all disposable symbols /R/ when output from A K R substitutor module 30.

Figure 6:
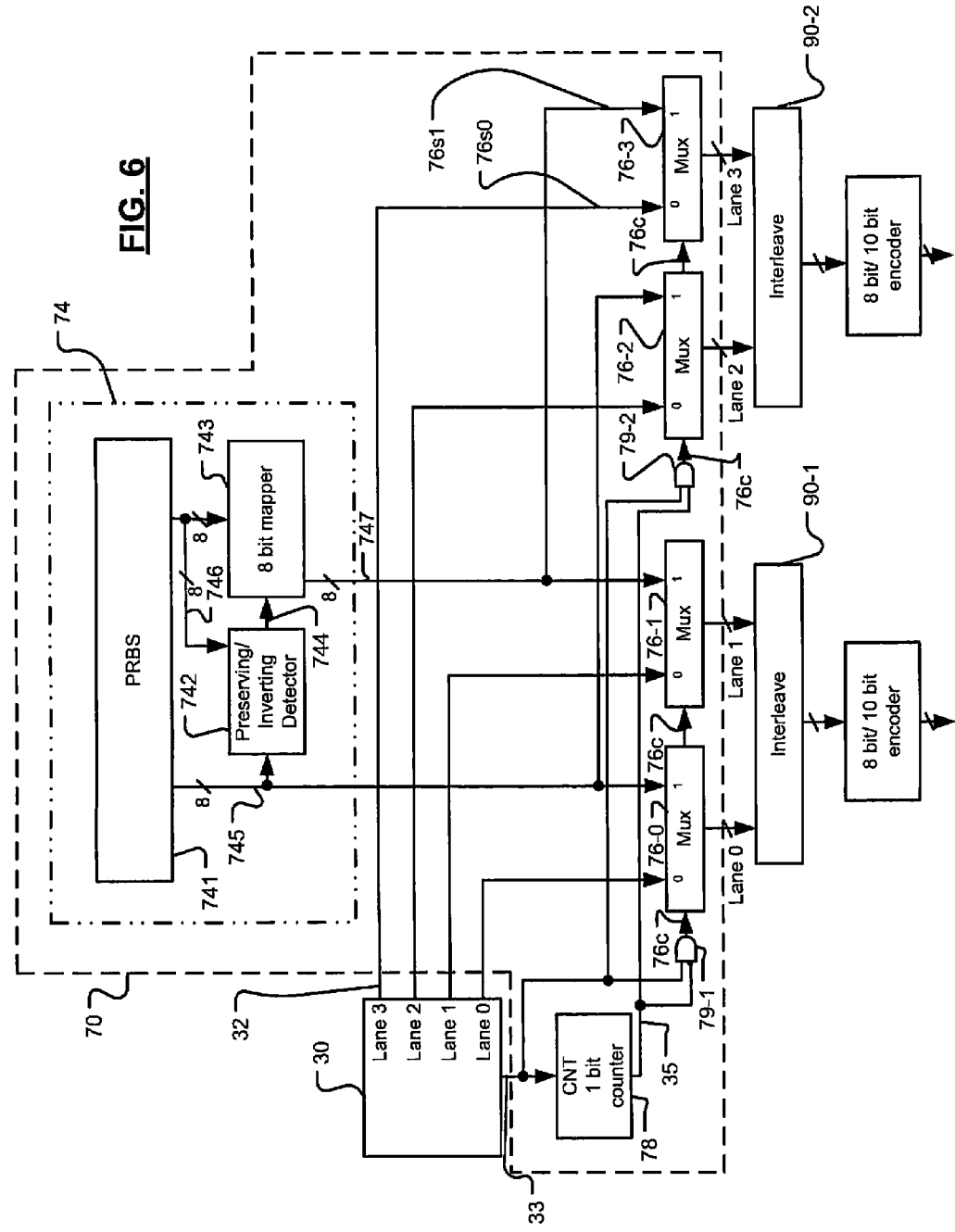
FIG. 6 is a functional block diagram of a 10 GBASE-X transmit PCS module layer for implementing a method of replacing a subset of disposable symbols /R/ in a 10 GBASE-X idle stream with random data in an interleaved mode.

Referring now to FIG. 6, an alternative exemplary /R/ to /D/symbol replacement module 70 according to various embodiments of the disclosure is illustrated. In this example, interleave modules 90-1, 90-2 are utilized to interleave a regular 10 GBASE-X data stream over 4-lanes into an interleaved 10 GBASE-X data stream over 2-lanes running at twice the data rate of the 4-lanes. The /R/ symbol detection module 72 illustrated in FIG. 5 is replaced with counter 78 and AND gates 79-1, 79-2. Counter 78 is connected to A K R substitutor module 30 by an /R/ column output indicator signal line 33. In one embodiment, A K R substitutor module 30 outputs a 1 (or, logical high) on line 33 each and every time A K R substitutor module 30 outputs a column of disposable symbols /R/ on lanes 32. Counter 78 is a 1-bit counter that alternates outputting a logical 1 and logical 0 to AND gates 79-1, 79-2 each time counter 78 receives a logical 1 input on /R/ column output indicator signal 33. This /R/column output indicator signal 33 is also input to AND gates 79-1, 79-2.

The other input to AND gates 79-1, 79-2 is connected to the output of counter 78 such that, due to the inverting input on AND gate 79-1, AND gates 79-1 and 79-2 alternate between outputting a logical 1 to $Mux_0$ 76-0 and $Mux_1$ 76-1, and to $Mux_2$ 76-2 and $Mux_3$ 76-3, respectively. The operation of counter 78 and AND gates 79-1, 79-2 controls the multiplexing modules 76 to output random data received from random data generation module 74 on either lanes 0 and 1 or lanes 2 and 3, while outputting /R/ symbols in the other lanes, whenever a column of disposable symbols /R/ is generated by A K R substitutor module 30.

By design, disposable symbols /R/ preserve the running disparity on a signal line so that a column of disposable symbols /R/ may be added or deleted to a data stream without affecting line disparity. Thus, one must ensure that the running disparity is not affected when replacing disposable symbols /R/ with randomly selected data symbols, as described above. In a non-interleaved case, e.g., as illustrated in FIG. 5, one option is to limit the selection of random data symbols generated by random data generation module 74 to only those that preserve the running disparity. FIG. 7 is a table that lists the 8-bit symbols that are "Preserving" symbols, i.e., those that preserve the running disparity when transmitted. The empty cells in the table of FIG. 7 indicate those symbols that invert the running disparity, i.e., are "Inverting" symbols. By limiting the random data to only those symbols that are preserving symbols, the number of possible random data symbols is reduced from 256 to 134 possible symbols.

Figure 8A:
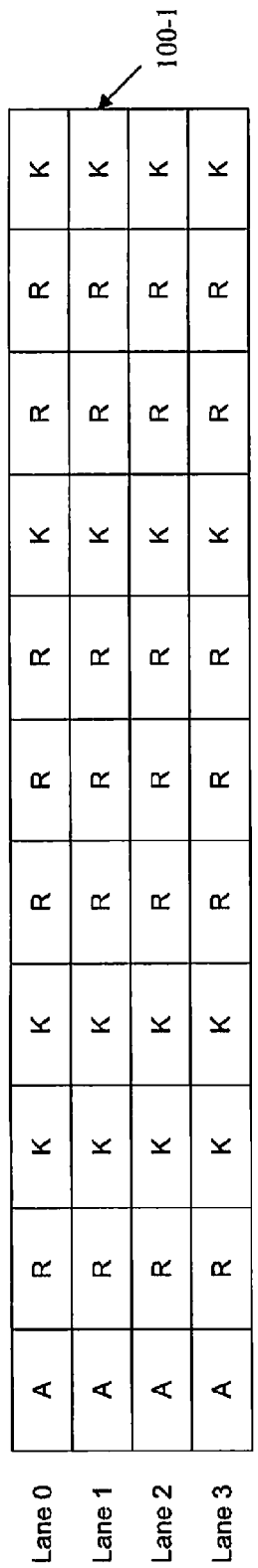
FIG. 8A is a data diagram of data and idle symbols in an exemplary 10 GBASE-X idle stream in a non-interleaved mode.
Figure 8B:
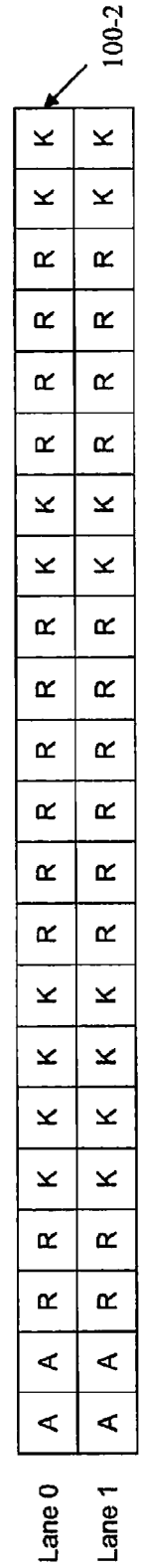
FIG. 8B is a data diagram of data and idle symbols in the exemplary 10 GBASE-X idle stream of FIG. 8A in an interleaved mode.
Figures 9A, 9B:
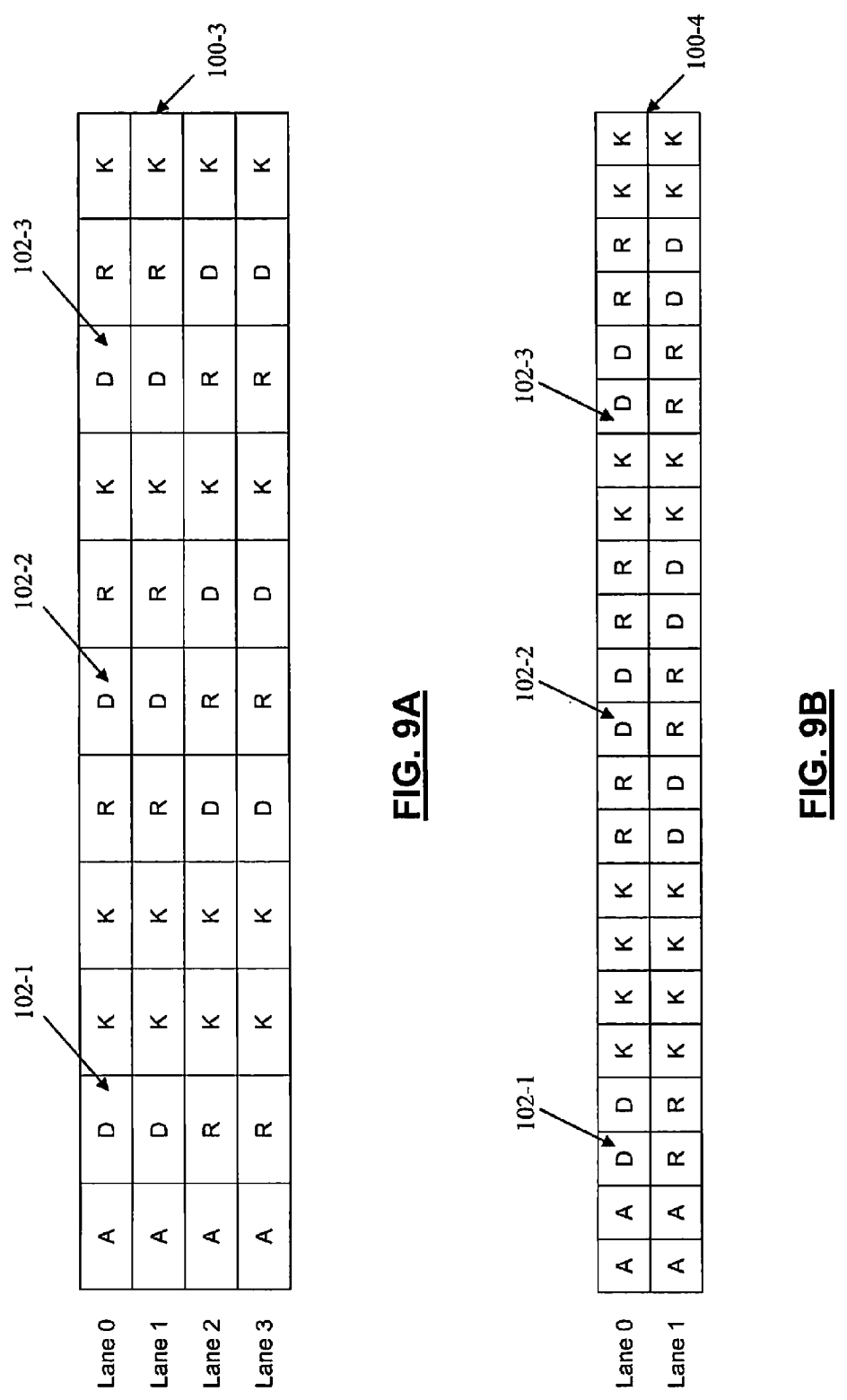

In an interleaved case, additional options are available to preserve the running disparity. FIG. 8 illustrates an exemplary 10 GBASE-X idle data stream 100. FIG. 8A illustrates the idle stream 100-1 in the non-interleaved case, while FIG. 8B illustrates the same idle stream 100-2 in the interleaved case. FIG. 9 illustrates the idle stream 100 of FIG. 8 in which a subset of the disposable symbols /R/ have been replaced with random data symbols /D/ 102-1 . . . 102-N according to various embodiments of the disclosure. FIG. 9A corresponds to the non-interleaved case 100-3 and FIG. 9B corresponds to the interleaved case 100-4. In the interleaved case, there are two symbols in each column, where "column" is defined by non-interleaved column width. As long as the two symbols of random data are of the same type, i.e., both are preserving or both are inverting, it is irrelevant whether the random data symbol /D/ 102 is preserving or inverting since the "column" does not affect the running disparity.

Figure 10A:
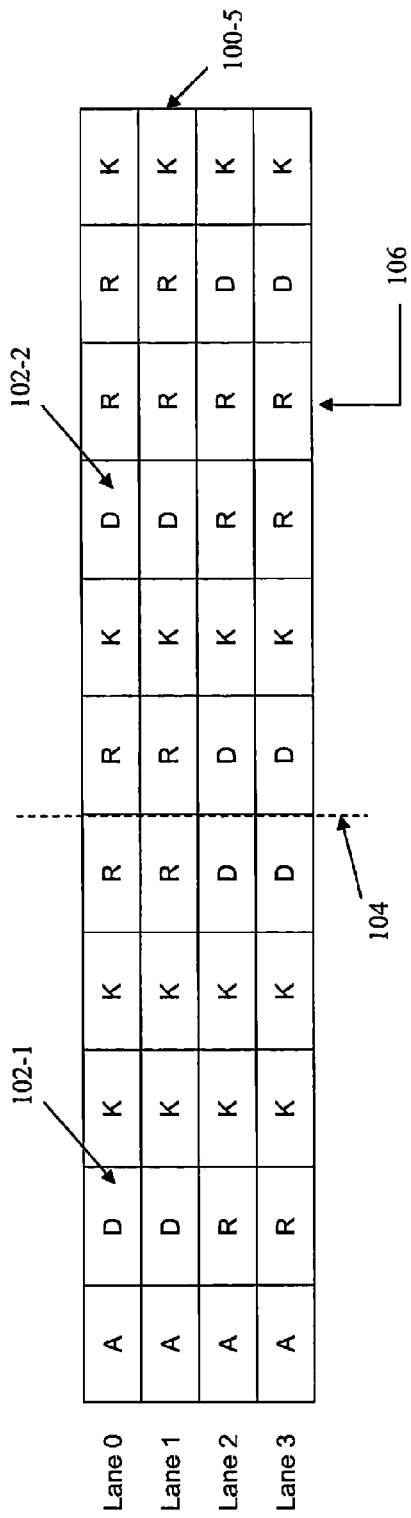
FIG. 10A is a data diagram of data and idle symbols in the exemplary 10 GBASE-X idle stream of FIG. 9A in a non-interleaved mode in which an /R/ column has been added and deleted.
Figure 10B:
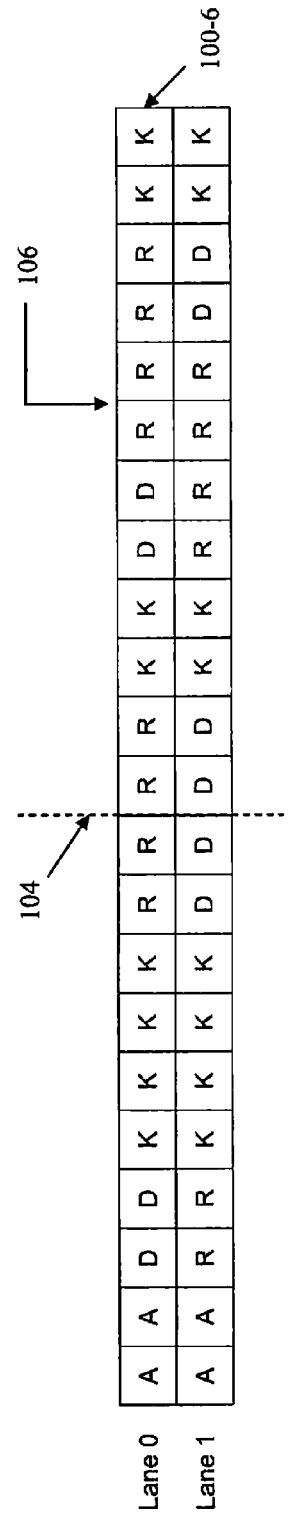
FIG. 10B is a data diagram of data and idle symbols in the exemplary 10 GBASE-X idle stream of FIG. 9A in an interleaved mode in which an /R/ column has been added and deleted.

If an /R/ symbol "column" is deleted in the interleaved case, two symbols of random data 102 are deleted, preserving the running disparity on the line. FIG. 10 illustrates an idle stream 100 in which (1) a subset of the disposable symbols /R/ have been replaced with random data symbol /D/ 102 according to various embodiments of the disclosure, and (2) /R/ columns have been inserted 106 and deleted 104. FIG. 10A corresponds to the non-interleaved case 100-5 and FIG. 10B corresponds to the interleaved case 100-6. As one can see, the deletion of a column of inverting random data in the non-interleaved case 100-5 affects the running disparity of a lane if inverting random data symbols are used, but the running disparity in the interleaved case 100-6 is unaffected by such a deletion.

Referring again to FIG. 6, the operation of /R/ to /D/ symbol replacement module 70 is configured to exploit the ability of the interleaved case to utilize the full universe of possible random data symbols, whether inverting or preserving. This is accomplished by configuring random data generation module 74 to ensure that both of the random data symbols that are used to replace disposable symbols /R/ are of the same type, i.e., either both inverting or both preserving.

Random data generation module 74 may include 16-bit random number generator 741, preserving/inverting detector 742 and 8-bit mapper 743. 16-bit random number generator 741 may comprise a Pseudo Random Binary Sequence (PRBS) generator or similar device, as is well known in the art, configured to output a 16-bit random binary number. The first 8-bits 745 and second 8-bits 746 of the 16-bit random number are output to preserving/inverting detector 742. The second 8-bits 746 are also received at 8-bit mapper 743, which further receives a control input from preserving/inverting detector 742 on line 744. To detect whether the first 8-bits 745 are inverting or preserving, the following algorithm may be used (where RND1[7:0]=the first 8-bits 745 of the 16-bit random number):

If RND1[4:0] is 0, 1, 2, 4, 8, 15, 16, 23, 24, 27, 29, 30 or 31, then it is considered to be within Group 1. If not, it is considered to be within Group 2.

If RND1[7:5] is 0, 4 or 7, then it is considered to be within Group A. If not, it is considered to be within Group B.

Based on the above, the preserving/inverting type of RND1 [7:0] ("PI1") can be determined by the following equation:

$$PI1 = \{RND1[7:0] \text{ belongs to Group 1 and Group } B) \text{ or } (RND1[7:0] \text{ belongs to Group 2 and Group } A\},$$

where PI1=1 means that RND1[7:0] is inverting, and PI1=0 means that RND1[7:0] is preserving.

Further, the preserving/inverting type ("PI2") of second 8-bits 746 is determined, for example by the same algorithm described above, and the preserving/inverting types PI1 and PI2 of first 8-bits 745 and second 8-bits 746, respectively, are output from preserving/inverting detector 742 to 8-bit mapper 743 over line 744. With this information, 8-bit mapper 743 may ensure that its output 747 is of the same preserving/inverting type as first 8-bits 745, thus preserving line disparity in operation.

Ideally, the output 747 of 8-bit mapper 743 should have a uniform distribution, thus providing as varied a frequency spectrum as possible. In practice, however, it has been found that the following algorithm may be utilized with acceptable results:

if (PI1=PI2) then DATA_OUT2[7:0]=RND2[7:0];
else if (RND2[7:6]=01) then DATA_OUT2[7:0]={RND2 [5], 00, RND2[5:0]};
else DATA_OUT2[7:0]={RND2[7:6], ~RND2[5], RND2 [4:0]},
where:
RND1[7:0]=first 8-bits 745;
RND2[7:0]=second 8-bits 746;
PI1=preserving/inverting type of RND1[7:0];
PI2=preserving/inverting type of RND2[7:0];
DATA_OUT2=output 747 of 8-bit mapper 743; and
~RND2[5]=the opposite value of RND2[5] (that is, if RND2[5]=0, then ~RND2[5]=1, and if RND2[5]=1, then ~RND2[5]=0).

/R/ to /D/ symbol replacement module 70 as illustrated in FIG. 6 operates as follows. When substitutor module 30 outputs a column of disposable symbols /R/ on lanes 32, substitutor module 30 also outputs an /R/ column output indicator signal on line 33 to counter 78. Counter 78 is a 1-bit counter and the output 35 of counter 78 alternates between logical high (1) and logical low (0) each time counter 78 receives an /R/ column output indicator signal 33. Counter output 35 is one of the inputs to AND gates 79-1, 79-2, except the counter output 35 received at AND gate 79-1 is first inverted. The other input to AND gates 79-1, 79-2 comprises /R/ column output indicator signal 33. The result of this configuration is that the AND gates 79-1, 79-2 alternate outputting a logical high each and every time a column of disposable symbols /R/ is output by substitutor module 30. As illustrated, the output of AND gate 79-1 is connected to multiplexing modules 76-0 and 76-1, and the output of AND gate 79-2 is output to multiplexing modules 76-2 and 76-3. The output of the AND gates 79-1, 79-2 is used to control the multiplexing modules 76, as described below.

In the illustrated example, a separate multiplexing module 76 is utilized for each of the four lanes 32-0, 32-1, 32-2, 32-3, however, it is within the scope of the disclosure to utilize less (or more) than four multiplexing modules 76, e.g., one multiplexing module 76 for all four lanes. Each of the multiplexing modules 76 has three inputs, one control input 76c and two signal inputs 76s0 and 76s1. As described above, control input 76c is the output of either one of AND gates 79-1 or 79-2. Signal input 76s0 is connected to the lanes 32 such that multiplexing module 76 receives the data signal directly from substitutor module 30. Signal input 76s1 is connected to either one of the two outputs of random data generation module 74.

In the illustrated example, multiplexing modules 76-0 and 76-2 are connected to first 8-bits 745, while multiplexing modules 76-1 and 76-3 are connected to the output 747 of 8-bit mapper 743. This configuration pairs multiplexing modules 76-0 to 76-1 and 76-2 to 76-3 such that each pair receives both the first 8-bits 745 and the output 747 of 8-bit mapper 743. Multiplexing module 76 is configured to output either input 76s0 or 76s1, depending on whether multiplexing module 76 receives a "1" or "0" on control input 76c, e.g., if multiplexing module 76 receives a "0" on 76c, multiplexing module 76 outputs signal 76s0, and if multiplexing module 76 receives a "1" on 76c, multiplexing module 76 outputs signal 76s1. In the illustrated example, the control inputs 76c of multiplexing modules 76-0 and 76-1 and the control inputs 76c of multiplexing modules 76-2 and 76-3 are connected such that the pairs described above operate together to coordinate their output of either the signal received from substitutor module 30 or from random data generation module 74.

With the configuration described above, the /R/ to /D/ symbol replacement module 70 operates as follows. When substitutor module 30 outputs a column of disposable symbols /R/ on lanes 32, substitutor module 30 also outputs a logical high or "1" on line 33. The output 35 of counter 78 (assuming an initial counter value of "0") will also be 1. The inputs to AND gate 79-1 will be "1" and "0" and, thus, 79-1 will output "0" to multiplexing modules 76-0 and 76-1. Multiplexing modules 76-0 and 76-1 will output their respective inputs 76s0, which comprise the disposable symbols /R/ output by substitutor module 30. The inputs to AND gate 79-2 will both be "1" and, thus, AND gate 79-2 will output "1" to multiplexing modules 76-2 and 76-3. Multiplexing modules 76-2 and 76-3 will output their respective inputs 76s1, which comprise the first 8-bits 745 and the output 747 of 8-bit mapper 743, respectively. As described above, first 8-bits 745 and the output 747 of 8-bit mapper 743 are generated such that the share a common preserving/inverting type and, when interleaved by interleave module 90, will not affect the line disparity if the column is deleted.

Figure 11:
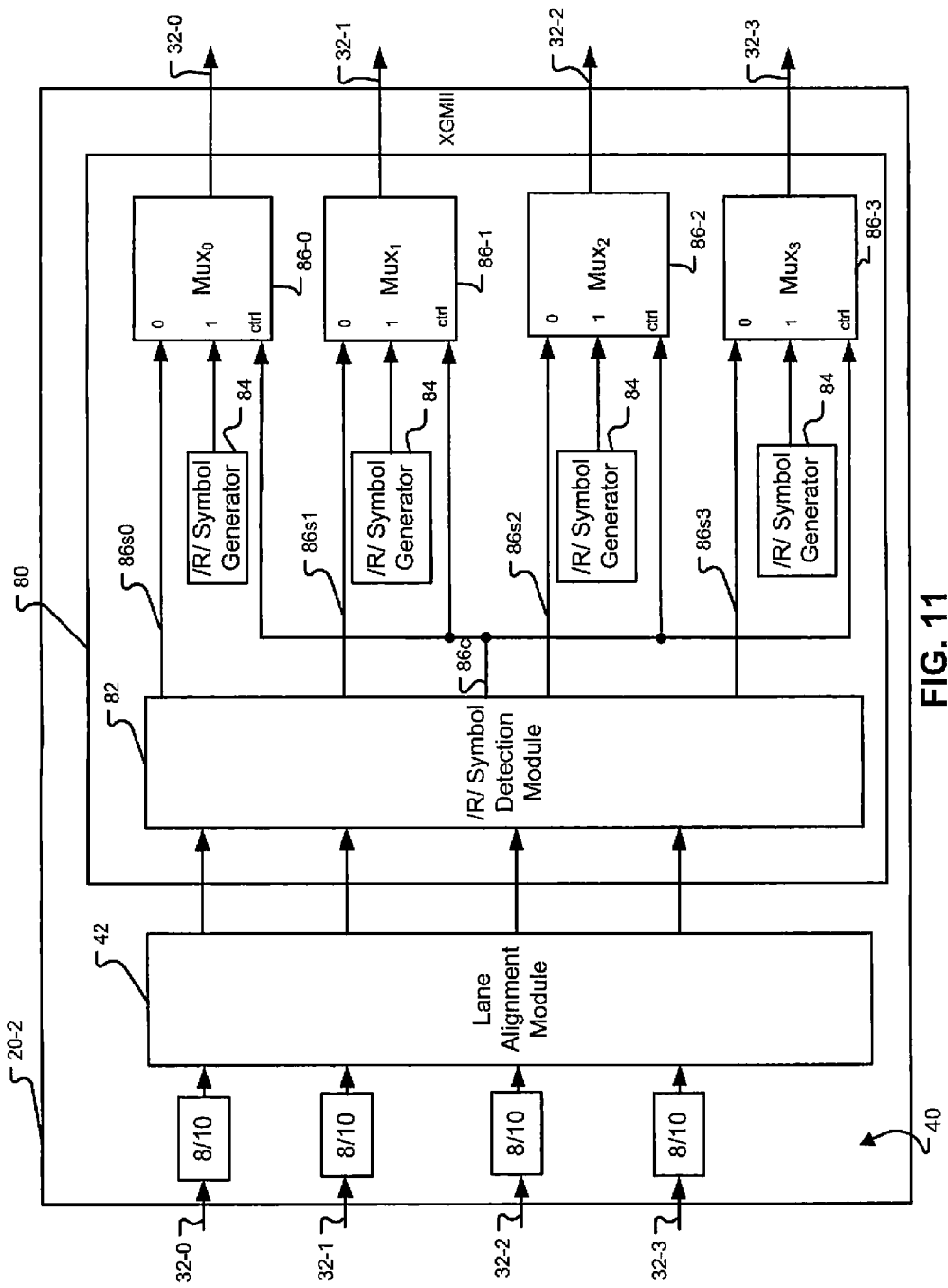
FIG. 11 is a functional block diagram of a 10 GBASE-X receive PCS module layer for implementing a method of replacing random data inserted in the place of a subset of disposable symbols /R/ in a 10 GBASE-X idle stream with disposable symbols /R/ in a non-interleaved mode.

The operation of an exemplary /D/ to /R/ symbol replacement module 80 according to various embodiments of the disclosure will be described in reference to FIG. 11. /D/ to /R/ symbol replacement module 80 comprises /R/symbol detection module 82, /R/ symbol generator 84 and multiplexing module 86. /R/ symbol detection module 82 is configured to detect a disposable symbol /R/ in any of the lanes 32. In some embodiments, as described above, the four lanes 32 will include a pair of disposable symbols /R/ and a pair of random data symbols /D/ in an idle stream. For each lane 32, there are two outputs from /D/to /R/ symbol replacement module 80—data signal 86sx, where "x" is the lane number, and control signal 86c. Data signal 86sx comprises the input signal received by /R/ symbol detection module 82 on lane x. Control signal 86c comprises the control signal indicating whether a disposable symbol /R/ has been detected in any of the lanes 32. Multiplexing module 86 will also receive an input from /R/ symbol generator 84.

In this configuration, multiplexing module 86 will output either data signal 86sx or a disposable symbol /R/ received from /R/ symbol generator 84, depending on the control signal 86c. For example, if control signal 86c equals "0," multiplexing module 86 will output data signal 86sx on lane x. Conversely, if control signal 86c equals "1," multiplexing module 86 will output a disposable symbol /R/ received from /R/ symbol generator 84. In this manner, the signal output from /D/ to /R/ symbol replacement module 80 on lanes 32 will comprise either (i) the signal received from lane alignment module 42, or (ii) a full column of disposable symbols /R/. It is within the scope of the disclosure to accomplish this function with a different configuration of the /D/ to /R/ symbol replacement module 80. For example, /D/ to /R/ symbol replacement module 80 could be configured to merely replace the random data in the /R/ columns received from lane alignment module 42 by passing on the received disposable symbols /R/ as detected to all four lanes upon /R/ symbol detection.

Figure 12:
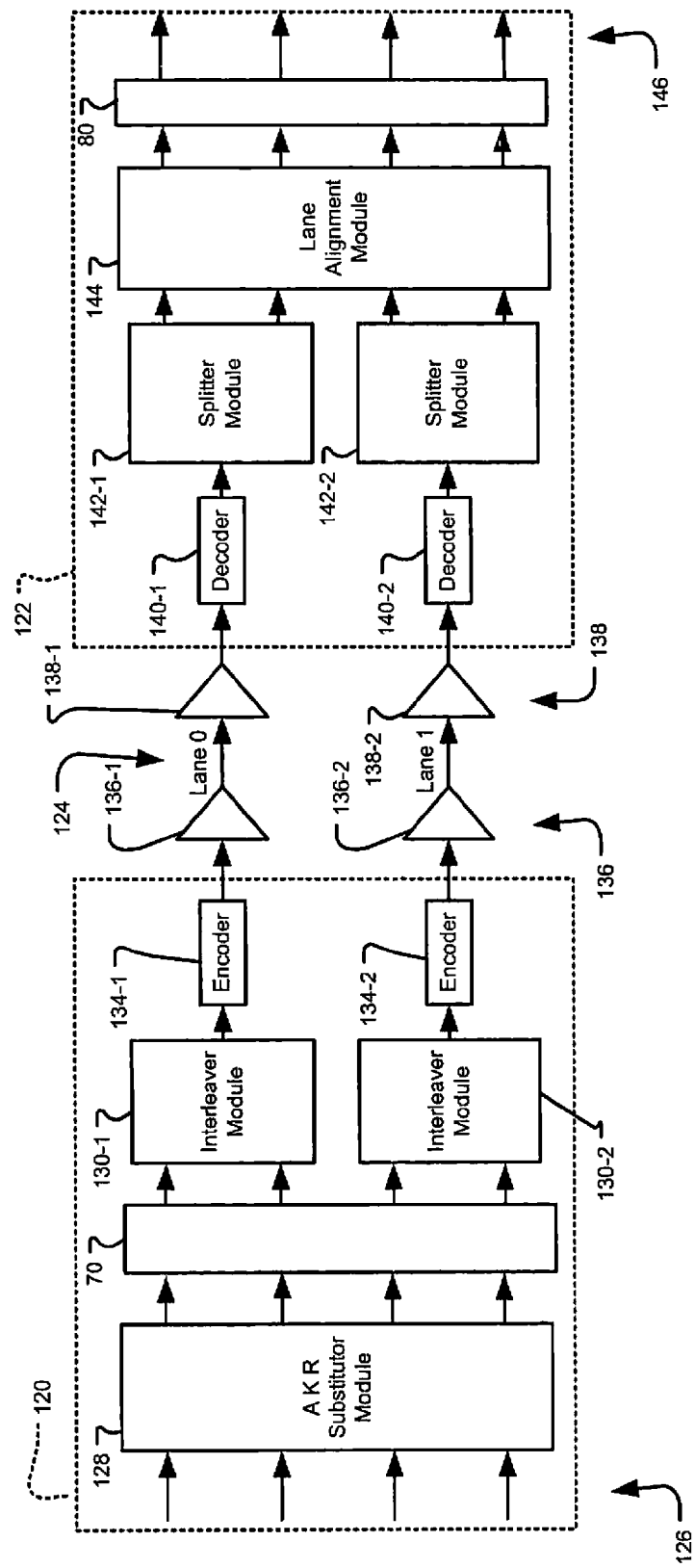
FIG. 12 is a functional block diagram of 10 GBASE-X transmit and receive PCS module layers for implementing a method of replacing a subset of disposable symbols /R/ in a 10 GBASE-X idle stream with random data in an interleaved mode.

Referring now to FIG. 12, a transmit PCS module 120 and a receive PCS module 122 are shown. Transmit PCS module 120 and receive PCS module 122 are configured to operate in interleaved 10 GBASE-X mode, otherwise referred to as 20 GBASE-X mode. The interleaved mode provides 4-lane to 2-lane aggregation that allows a physical medium 124 to propagate aggregated data through two 10 Gb lanes. Each lane employs an 8/10 encoding scheme.

Transmit PCS module 120 receives data through four input lanes 126. Input lanes 126 can include 10 GBASE-X and/or XGMII lanes. An A K R substitutor module 128 replaces incoming idle symbols with control symbols in accordance with a method specified by IEEE 802.3 10 GBASE-X. The /R/ to /D/ symbol replacement module 70 of various embodiments of the disclosure replaces a subset of disposable symbols /R/ in the received data stream with random data symbols /D/, as described above. Each interleaver module 130-1, 130-2 receives the data from two adjacent output lanes of the /R/ to /D/ symbol replacement module 70 and interleaves the two lanes of data onto one of two output lanes. Encoders 134-1, 134-2 encode data from respective lanes. Encoders 134-1, 134-2 employ the 8/10 encoding scheme when operating in the interleaved 10 GBASE-X mode. Line drivers or amplifiers 136 drive interleaved data onto respective lanes of physical medium 124.

A receiver includes amplifiers 138 that receive the interleaved data from respective lanes of physical medium 124. Amplifiers 138 communicate the interleaved data to respective inputs of receive PCS module 122. Receive PCS module 122 includes decoders 140-1, 140-2 that decode the interleaved data from respective inputs of PCS module 122. Decoders 140-1, 140-2 employ an 8/10 decoding scheme. Splitter modules 142-1, 142-2 receive the data from respective decoders 140-1, 140-2 and deinterleave the data. A lane alignment module 144 realigns the data from splitter modules 142-1, 142-2 and communicates the realigned data to the /D/ to /R/ symbol replacement module 80 of various embodiments of the disclosure. Lane alignment module 144 employs a method that aligns the data based on the control symbols that replaced some of the idle symbols in the blocks of interleaved data. /D/ to /R/ symbol replacement module 80 replaces the random data in the /R/ columns, which was inserted by /R/ to /D/ symbol replacement module 70, as described above, with disposable symbols /R/, and outputs the modified signal to output lanes 146. Output lanes 146 can include 10 GBASE-X and/or XGMII lanes.

It should be noted that the above described exemplary embodiments may be modified and not depart from the scope of the disclosure. For example, the specific devices described above may be replaced by functionally similar or equivalent devices without departing from the spirit of the disclosure. Additionally, the term "random data," "random data symbols" and "randomly generated data" have been used interchangeably above. These terms are meant to include any or all of the following: (1) data values that are randomly generated, (2) data values that are selected randomly from a universe of all or some potential data values, and (3) data values that are either randomly generated or selected randomly from a universe of all or some potential data values, in combination with data that is predetermined or pre-associated with the data values randomly selected or generated.

Figure 13B:
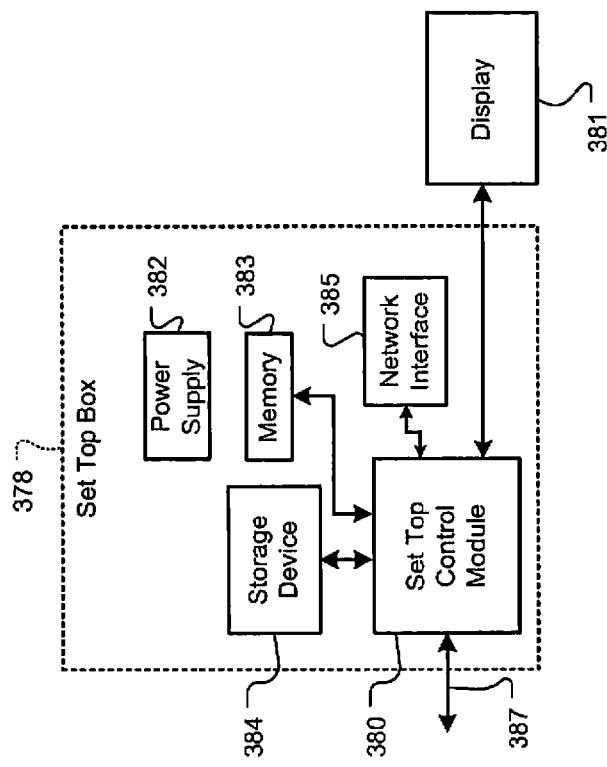
FIG. 13B is a functional block diagram of a set top box.
Figure 13A:
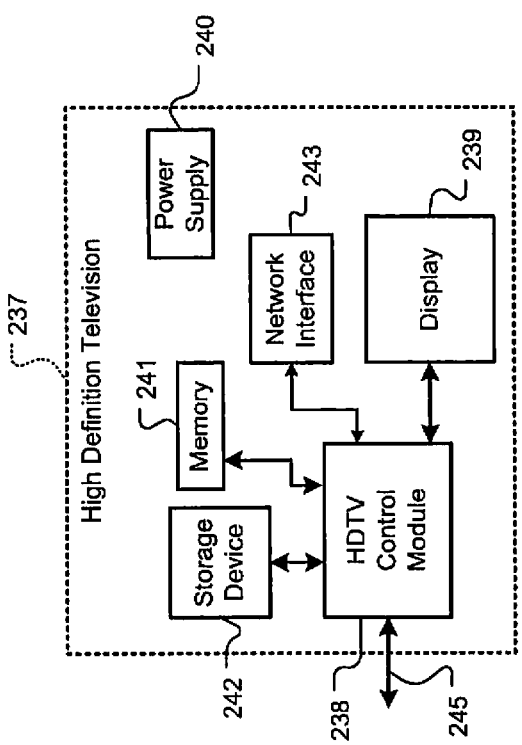
FIG. 13A is a functional block diagram of a high definition television.

Referring now to FIGS. 13A-13B, various exemplary implementations incorporating the teachings of the present disclosure are shown.

Referring now to FIG. 13A, the teachings of the disclosure can be implemented in a network interface 243 of a high definition television (HDTV) 237. The HDTV 237 includes an HDTV control module 238, a display 239, a power supply 240, memory 241, a storage device 242, the network interface 243, and an external interface 245. If the network interface 243 includes a wireless local area network interface, an antenna (not shown) may be included.

The HDTV 237 can receive input signals from the network interface 243 and/or the external interface 245, which can send and receive data via cable, broadband Internet, and/or satellite. The HDTV control module 238 may process the input signals, including encoding, decoding, filtering, and/or formatting, and generate output signals. The output signals may be communicated to one or more of the display 239, memory 241, the storage device 242, the network interface 243, and the external interface 245.

Memory 241 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 242 may include an optical storage drive, such as a DVD drive, and/or a hard disk drive (HDD). The HDTV control module 238 communicates externally via the network interface 243 and/or the external interface 245. The power supply 240 provides power to the components of the HDTV 237.

Referring now to FIG. 13B, the teachings of the disclosure can be implemented in a network interface 385 of a set top box 378. The set top box 378 includes a set top control module 380, a display 381, a power supply 382, memory 383, a storage device 384, and the network interface 385. If the network interface 385 includes a wireless local area network interface, an antenna (not shown) may be included.

The set top control module 380 may receive input signals from the network interface 385 and an external interface 387, which can send and receive data via cable, broadband Internet, and/or satellite. The set top control module 380 may process signals, including encoding, decoding, filtering, and/or formatting, and generate output signals. The output signals may include audio and/or video signals in standard and/or high definition formats. The output signals may be communicated to the network interface 385 and/or to the display 381. The display 381 may include a television, a projector, and/or a monitor.

The power supply 382 provides power to the components of the set top box 378. Memory 383 may include random access memory (RAM) and/or nonvolatile memory. Nonvolatile memory may include any suitable type of semiconductor or solid-state memory, such as flash memory (including NAND and NOR flash memory), phase change memory, magnetic RAM, and multi-state memory, in which each memory cell has more than two states. The storage device 384 may include an optical storage drive, such as a DVD drive, and/or a hard disk drive (HDD).

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A network interface, comprising:
a substitutor module configured to generate a second data stream by replacing idle symbols in a first data stream with one or more of alignment symbols, boundary symbols and disposable symbols;
a symbol replacement module configured to (i) receive the second data stream, (ii) generate random data, and (iii) replace at least one of the disposable symbols in the second data stream with the random data to generate a third data stream; and
an encoder module configured to (i) receive the third data stream and (ii) encode the third data stream;
wherein the symbol replacement module is configured to generate the random data by (i) generating a random binary number and (ii) selecting a data value associated with the random binary number as the random data.

2. The network interface of claim 1, wherein the symbol replacement module is configured to detect the disposable symbols in the second data stream.

3. The network interface of claim 1, further comprising a random number generator configured to generate the random data.

4. The network interface of claim 1, wherein the symbol replacement module is configured to (i) receive the second data stream over a plurality of lanes and (ii) alternate which one of the plurality of lanes receives the random data.

5. The network interface of claim 1, wherein the symbol replacement module is configured to generate the random data by (i) generating a random binary number and (ii) selecting at least a portion of the random binary number as the random data.

6. The network interface of claim 1, wherein:
the second data stream comprises a 10 GBASE-X data stream; and
the encoder module comprises an 8/10 bit encoder module.

7. The network interface of claim 6, wherein the symbol replacement module is configured to detect disposable symbols in the 10 GBASE-X data stream.

8. The network interface of claim 7, wherein:
the symbol replacement module is configured to replace a subset of the disposable symbols with the random data; and
the subset comprises two of four lanes in an aligned column of the 10 GBASE-X data stream.

9. The network interface of claim 8, wherein the symbol replacement module is configured to alternate selection of the two of the four lanes.

10. The network interface of claim 1, wherein the random data comprises at least one of inverting data or preserving data.

11. The network interface of claim 1, wherein the random data does not include:
alignment symbols, boundary symbols and disposable symbols, including the one or more of the alignment symbols, boundary symbols and disposable symbols.

12. The network interface of claim 1, wherein:
the substitutor module is configured to detect the disposable symbols in the second data stream and generate an indicator signal; and
the network interface further comprises a counter configured to alternate lanes selected to receive the random data based on the indicator signal.

13. The network interface of claim 12, further comprising multiplexers, each of the multiplexers configured to (i) receive a portion of the second data stream and a portion of the random data and (ii) based on an output of the counter, select one of the portion of the second data stream and the portion of the random data.

14. The network interface of claim 1, further comprising:
a random number generator configured to generate a first random number and a second random number, wherein the first random number and the second random number are each one of a preserving number type and an inverting number type;
a mapper configured to match a number type of the second random number with the number type of the first random number;
a first multiplexer configured to receive the first random number;
a second multiplexer configured to receive the second random number; and
an interleave module configured to interleave an output of the first multiplexer with an output of the second multiplexer.

15. A network interface, comprising:
a decoder module configured to (i) receive a first data stream comprising one or more of random data, alignment symbols, boundary symbols and first disposable symbols and (ii) decode the first data stream; and
a symbol replacement module configured to (i) receive the first data stream, (ii) detect the first disposable symbols in the first data stream, (iii) determine the random data of the first data stream based on the detected first disposable symbols, and (iv) replace the random data in the first data stream with second disposable symbols to generate a second data stream;
wherein the random data is generated by (i) generating a random binary number and (ii) selecting a data value associated with the random binary number as the random data.

16. The network interface of claim 15, wherein the symbol replacement module is configured to detect the first disposable symbols in at least one of four lanes in an aligned column of the first data stream.

17. The network interface of claim 15, wherein the symbol replacement module is configured to detect the first disposable symbols in two of four lanes in an aligned column of the first data stream.

18. The network interface of claim 15, wherein the first data stream comprises an original data stream with at least one disposable symbol replaced by the random data.

19. The network interface of claim 18, wherein:
the original data stream comprises first data;
the second data stream comprises second data; and
the second data includes the first data.

20. The network interface of claim 18, wherein the symbol replacement module is configured to detect the first disposable symbols in two of four lanes in an aligned column of the first data stream.

21. The network interface of claim 18, wherein the random data is generated by (i) generating a random binary number and (ii) selecting at least a portion of the random binary number as the random data.

22. The network interface of claim 15, wherein:
the decoder module comprises an 8/10 bit decoder module;
the symbol replacement module replaces the random data with disposable symbols; and
the first data stream comprises a 10 GBASE-X data stream.

23. The network interface of claim 22, wherein the detection of the first disposable symbols in the first data stream comprises detecting a disposable symbol in at least one of four lanes in an aligned column of the 10 GBASE-X data stream.

24. The network interface of claim 22, wherein the detection of the first disposable symbols in the first data stream comprises detecting a disposable symbol in two of four lanes in an aligned column of the 10 GBASE-X data stream.

25. The network interface of claim 22, wherein the random data replaces at least one disposable symbol in an original data stream to generate the 10GBASE-X data stream.

26. The network interface of claim 25, wherein:
the original data stream comprises first data;
the second data stream comprises second data; and
the second data includes the first data.

* * * * *